United States Patent
Depierre et al.

(10) Patent No.: US 9,114,556 B2
(45) Date of Patent: Aug. 25, 2015

(54) PROCESS FOR MOLDING A PLASTIC PART WITH A METAL INSERT HELD IN PLACE BY MAGNETIZATION AND MOLDING DEVICE

(75) Inventors: Emmanuel Depierre, Thiescourt (FR); Romain Debailleul, Villers-sur-Coudun (FR); Jean-Pierre Roze, Cauffry (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 888 days.

(21) Appl. No.: 13/259,782

(22) PCT Filed: Mar. 29, 2010

(86) PCT No.: PCT/FR2010/050570
§ 371 (c)(1),
(2), (4) Date: Dec. 9, 2011

(87) PCT Pub. No.: WO2010/112745
PCT Pub. Date: Oct. 7, 2010

(65) Prior Publication Data
US 2012/0074618 A1  Mar. 29, 2012

(30) Foreign Application Priority Data
Mar. 30, 2009  (FR) ..................... 09 51953

(51) Int. Cl.
*B29C 33/16* (2006.01)
*B29C 45/14* (2006.01)

(52) U.S. Cl.
CPC ........... *B29C 33/16* (2013.01); *B29C 45/14065* (2013.01)

(58) Field of Classification Search
CPC .......................... B29C 45/14065; B29C 33/16
USPC ........................... 264/275; 425/3, 127, 129.1
See application file for complete search history.

(56) References Cited

U.S. PATENT DOCUMENTS

| 3,121,193 | A | 2/1964 | Engelsted et al. |
| 5,266,914 | A | 11/1993 | Dickson et al. |

(Continued)

FOREIGN PATENT DOCUMENTS

| CH | 335222 | 12/1958 |
| DE | 23 40 811 | 2/1975 |

(Continued)

OTHER PUBLICATIONS

International Search Report issued Jun. 7, 2010, in Patent Application No. PCT/FR2010/050570.

(Continued)

*Primary Examiner* — Edmund Lee
(74) *Attorney, Agent, or Firm* — Oblon, McClelland, Maier & Neustadt, L.L.P.

(57) ABSTRACT

A process for molding a beading in particular on the periphery of a window or for molding a plastic window, in which a constituent plastic of said beading or of said plastic window respectively is introduced into a molding cavity in which at least one ferromagnetic insert, such as a trim, has been placed beforehand, wherein said insert is held in position in said molding cavity during the introduction of said plastic by at least one magnet which can move between two positions, an active position in which it exerts an attractive force on said insert across the internal surface of the molding cavity and an inactive position I in which it exerts no attractive force on said insert.

10 Claims, 4 Drawing Sheets

(56) References Cited

U.S. PATENT DOCUMENTS

| | | | |
|---|---|---|---|
| 5,665,397 A * | 9/1997 | Fisher et al. | 425/116 |
| 5,707,473 A * | 1/1998 | Agrawal et al. | 156/245 |
| 5,916,600 A * | 6/1999 | Dubay et al. | 425/116 |
| 6,090,322 A * | 7/2000 | Tsurutani et al. | 264/135 |
| 6,464,922 B1 * | 10/2002 | Bogdan | 264/277 |
| 6,495,082 B1 * | 12/2002 | Ash et al. | 264/240 |
| 8,603,379 B2 * | 12/2013 | Yeh et al. | 264/275 |
| 2005/0129901 A1 * | 6/2005 | Swindler et al. | 428/76 |
| 2005/0269725 A1 | 12/2005 | Kubota | |
| 2007/0275229 A1 * | 11/2007 | Laws et al. | 428/318.8 |
| 2009/0032211 A1 * | 2/2009 | Hanna et al. | 164/498 |
| 2011/0057342 A1 * | 3/2011 | Meinzinger et al. | 264/39 |

FOREIGN PATENT DOCUMENTS

| | | |
|---|---|---|
| DE | 31 16 339 A1 | 12/1982 |
| EP | 1 033 223 A1 | 9/2000 |
| EP | 1 588 821 A1 | 10/2005 |
| GB | 2 045 149 A | 10/1980 |
| JP | 2002-103348 | 4/2002 |
| WO | WO 2007/018042 A1 | 2/2007 |

OTHER PUBLICATIONS

U.S. Appl. No. 13/259,728, filed Sep. 23, 2011, Depierre, et al.

\* cited by examiner

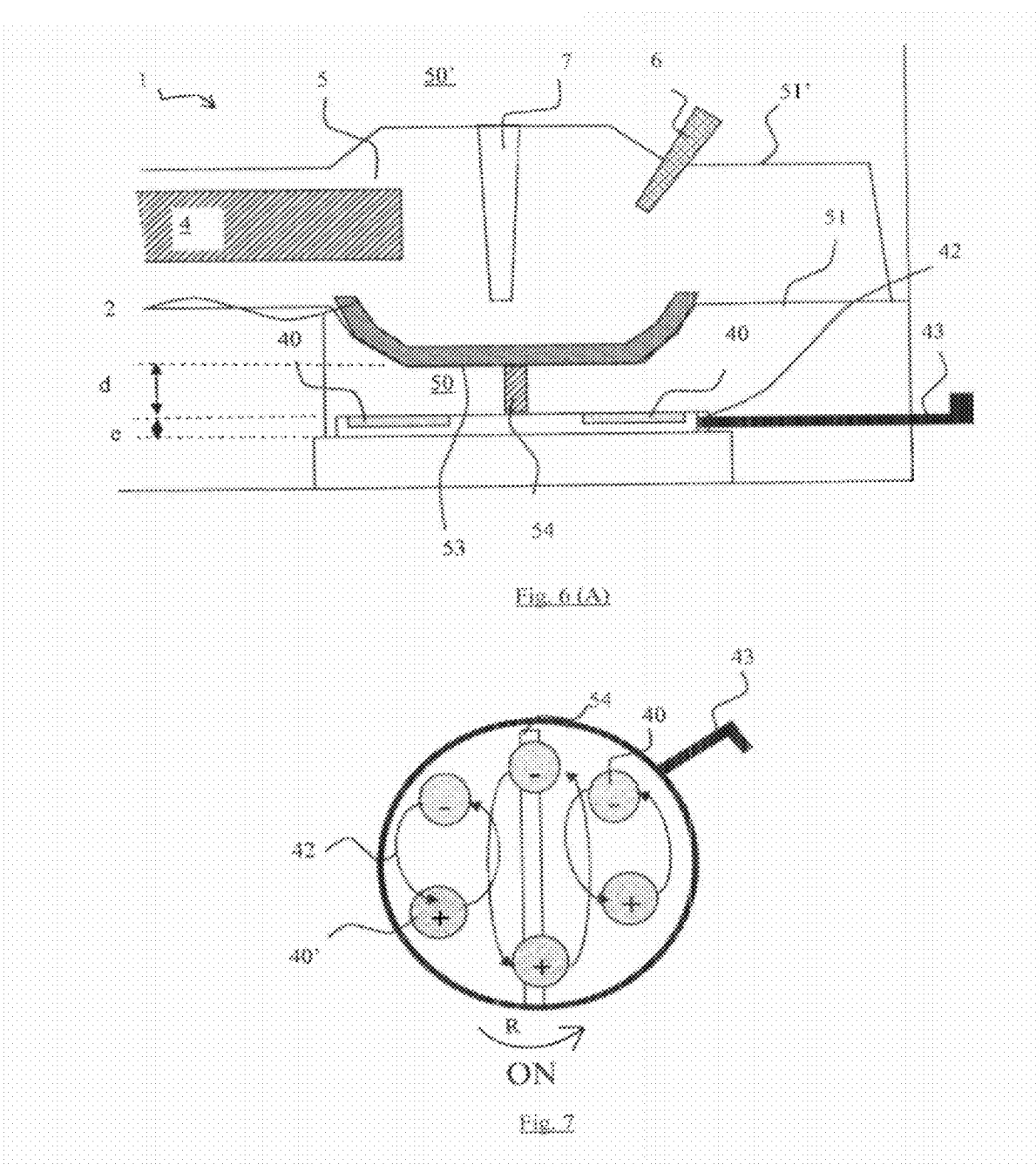

PROCESS FOR MOLDING A PLASTIC PART WITH A METAL INSERT HELD IN PLACE BY MAGNETIZATION AND MOLDING DEVICE

CROSS REFERENCE TO RELATED APPLICATIONS

The present application is the US counterpart of WO 10/112745, the text of which is incorporated by reference and claims the priority of the French application No. 0951953 filed on Mar. 30, 2009, the text of which is incorporated by reference The present invention relates to the field of molding parts for the production of windows.

The present invention relates more particularly to the production of beadings on windows by molding or to the production of plastic windows (for example made of polycarbonate).

It relates more particularly to a process for molding a beading in particular on the periphery of a window or for molding a plastic window, in which a constituent plastic of said beading or of said plastic window respectively is introduced into a molding cavity in which an insert, such as a trim, has been positioned beforehand.

The prior art of International patent application WO 2007/018042 discloses a system for fastening a metal insert using an electromagnet to retain the insert while the mold is being closed and during molding.

This system is difficult to manufacture and to use, as it requires the power supply for the electromagnet to be controlled.

One object of the invention is to alleviate the drawbacks of the prior art by providing a system for retaining a metal insert during the molding of a beading, which system is simple, easy to manufacture and easy to use.

Another object of the invention is to enable the insert to be retained through the wall of the molding cavity, without having to provide a particular zone and without having to use a surface seal in the molding cavity.

The present invention thus relates in its widest context to a process for molding a beading in particular on the periphery of a window, or for molding a plastic window, as claimed in claim 1. According to this process, a constituent plastic of said molding or of said plastic window respectively is introduced into a molding cavity in which at least one ferromagnetic insert, such as a trim, has been placed beforehand, and said insert is held in position in said molding cavity during the introduction of said plastic by at least one magnet which can move between two positions, an active position A in which it exerts an attractive force on said insert across the internal surface of the molding cavity and an inactive position I in which it exerts no attractive force on said insert.

Within the context of the present invention, the term "ferromagnetic" is understood, as is usual, to mean the property that certain elements have of being strongly magnetized under the effect of an external magnetic field (i.e. elements based on iron, cobalt, nickel and a large number of alloys thereof, particularly steels), as opposed to what are called "paramagnetic" elements (i.e. elements based on aluminum, chromium, platinum, etc.) which admittedly undergo actions of the same nature as iron, but these are much less intense, it being moreover recalled that a magnet is a ferromagnetic body that retains a substantial level of magnetization even after the external field has disappeared (i.e. remanent magnetization).

Preferably, the magnet(s) can move between the two positions, namely the active position A and the inactive position I, by a rotational movement R and/or a translational movement T.

In one embodiment of the invention, several magnets can move together in a single movement.

In this embodiment of the invention, said set of magnets is preferably divided into two groups of magnets so that when one group is in the inactive position I, in which it exerts no attractive force on said insert, the other group exerts a repulsive force on said insert.

In this embodiment of the invention in particular, said insert may be placed in the molding cavity astride a paramagnetic rod.

To implement the process according to the invention, the magnet(s) is (are) preferably:
  placed in the active position A before the start of injection of the constituent plastic of said beading or of said plastic window respectively; and
  the magnet(s) is (are) preferably placed in the inactive position I after the end of injection of the constituent plastic of said beading, or of said plastic window respectively.

In addition, the magnet(s) is (are) preferably placed in the active position A after said insert has been placed in the molding cavity.

Furthermore, the magnet(s) is (are) preferably placed in the inactive position I before the window is removed from the mold.

The present invention also relates to a molding device for implementing the molding process according to the invention, this device comprising a molding cavity includes, in front of its internal molding surface, at least one magnet which can move between two positions, an active position A which it exerts an attractive force across the internal surface of the molding cavity on said insert and an inactive position I in which it exerts no attractive force on said insert.

Furthermore, said magnet(s) is (are) preferably placed on at least one slide that can more in a translational movement T and/or on at least one disk that can more in a rotational movement R.

The present invention also relates to the use of at least one movable magnet for implementing the molding process according to the invention.

Advantageously, the invention provides reliable retention by magnetic attraction of the ferromagnetic insert during the molding operation by means of simple elements that are easy to manufacture and to use.

Advantageously, the invention makes it easier to demold the assembly that incorporates the insert by magnetic repulsion of the ferromagnetic insert after the molding operation.

This magnetic repulsion could be achieved by the movement of a magnet on itself, but in the context of the invention it is preferred to use a plurality of magnets divided into two groups in such a way that when one group of at least one magnet is not in the active position in which it (they) exerts (exert) an attractive force on said insert, then the other group of at least one magnet exerts a repulsive force on said insert.

Also advantageously this attractive magnetic force is exerted or these attractive/repulsive magnetic forces are exerted across the internal surface of the molding cavity. Thus, on the surface molding cavity there is no movable element enabling the magnet(s) to move. As a result, maintenance of the mold is easy since there is no seal in this insert retention zone.

Again advantageously, there is no direct contact between the magnet(s) and the insert, thereby preventing any marking on the surface of the insert and also any deformation thereof.

Finally, advantageously, there is no complex peripheral equipment (of the electrical generator type for an electromagnet) and there is no problem of differential expansion (due for example to an electromagnet heating up), since there is no electromagnet.

The present invention will be better understood on reading the following detailed description of nonlimiting exemplary embodiments, together with the appended figures in which:

FIG. 6 illustrates a sectional view of the molding cavity of FIG. 4 with the insert held in position; and FIG. 7 illustrates a top view of the magnets of FIG. 6.

In these figures, the various elements have not been drawn to scale, and the background elements have not in general been shown, so as to make it easier to examine them.

Figure 1:
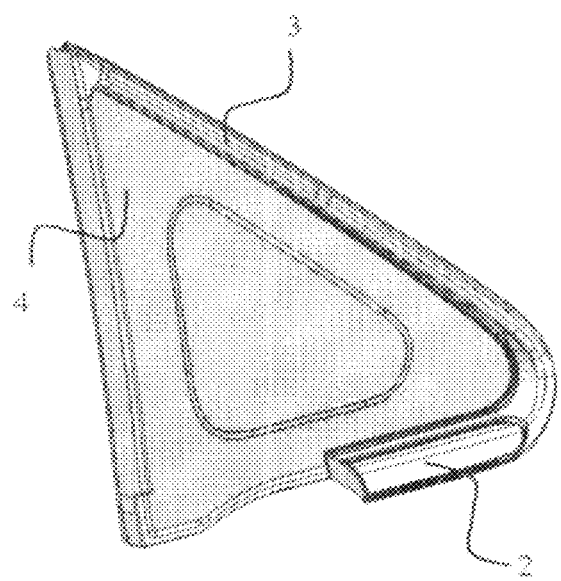
FIG. 1 illustrates a perspective view of a vehicle window having a trim fastened to the beading while said beading is being molded, the trim and the beading being illustrated in cross section in the bottom portion of the window.

FIG. 1 illustrates a fixed window 4 of a motor vehicle, on the periphery of which a beading 3 made of a flexible polymer is produced.

The constituent polymer material of the beading 3 may be a thermoplastic (PVC, TPE, etc.), a polyurethane or a synthetic rubber of the EPDM type, or any other suitable material.

The beading 3 was manufactured by implementing what is called an "encapsulation" manufacturing process as it includes a step of molding the beading 3 in a molding device, between two molding elements, one molding element receiving the inner face of the window and one molding element receiving the outer face of the window, these two molding elements being closed off on each other during the molding step.

In FIG. 1, the beading 3 runs along the entire periphery of the window 4, but this beading could just as well be positioned only on a portion of the periphery of the window or over any portion of the window.

To improve the esthetic appearance of the window, one portion of the beading 3 visible from outside the vehicle is masked by an insert 2, which consists here of a trim and is placed here only in the bottom portion of the window, but it could also be placed over the entire periphery of the window 4 and/or over any portion of the window.

The insert is prefabricated, i.e. it is formed prior to its introduction into the injection mold in which the beading 3 is formed. The insert may be made of magnetizable stainless steel, such as for example the steel grade S430 available from the company ArcelorMittal.

The window 4 may be a monolithic glazing panel, i.e. consisting of a single sheet of material, or it may be a composite glazing panel, i.e. consisting of several sheets of material between which at least one layer of adherent material is inserted in the case of laminated glazing panels, or at least one intermediate space in the case of multiple-glazing (double-glazing, triple-glazing, etc.) panels. The sheet(s) may be made of inorganic material, especially glass, or organic material, especially a plastic.

In the case of a vehicle window, the glazing panel generally has, at least partially on its periphery, an ornamental strip (not illustrated here). This ornamental strip results in general from an enamel deposited on the inner face of the glazing panel or on an intermediate face in the case of composite glazing panels, but it may also result from partial and/or peripheral coloration of a sheet of material used, especially a sheet of organic material.

To manufacture the beading 3 by molding, the window 4 is positioned in one mold portion, here the lower mold portion 50, and then an upper mold portion 50' is closed up on the lower mold portion so as to form a molding cavity 5 in the closed space between two these mold portions.

The molding system used here is a vertical molding machine, but it is quite possible to adapt it to a horizontal molding machine.

The perimeter of this molding cavity 5 is defined, on the one hand, by the inner face 51 of the lower mold portion 50 and, on the other hand, by the inner face 51' of the upper mold portion 50'. The edge of the window 4 penetrates into the molding cavity so as to mold the beading 3 on the periphery of the window 4.

The constituent plastic of the molding 3 is injected into the molding cavity via at least one injection orifice 6.

Before the mold is closed and the constituent plastic of the beading 3 starts to be injected, an insert 2, such as a trim, is introduced into the lower mold portion 50, and more precisely into a recess 52 that has a similar shape, but in negative, to the shape of the insert.

The upper mold portion 50' includes, on its inner face 51', at least one pin 7 for temporarily holding the insert 2 in place. Thus, when the upper mold portion 50' is closed up onto the lower mold portion 50, the pin 7 will temporarily hold the insert 2 in position in the recess 52.

Figure 2:
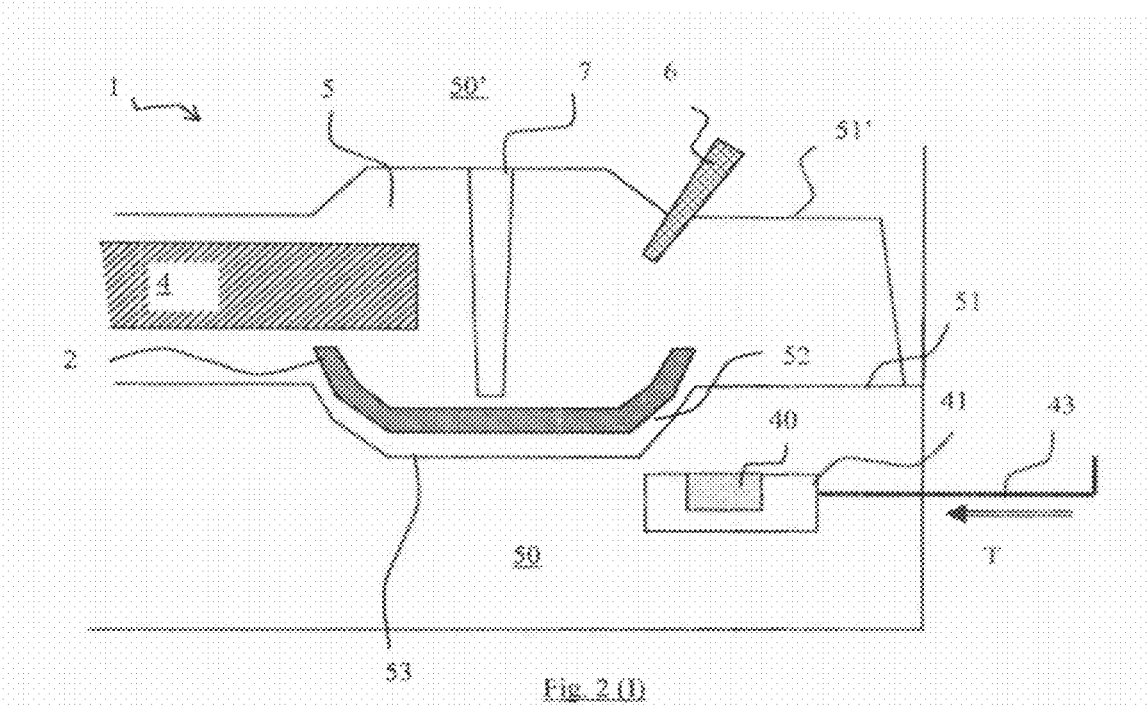
FIG. 2 illustrates a sectional view of a molding cavity in a first embodiment of the invention with the insert not held in position.
Figure 3:
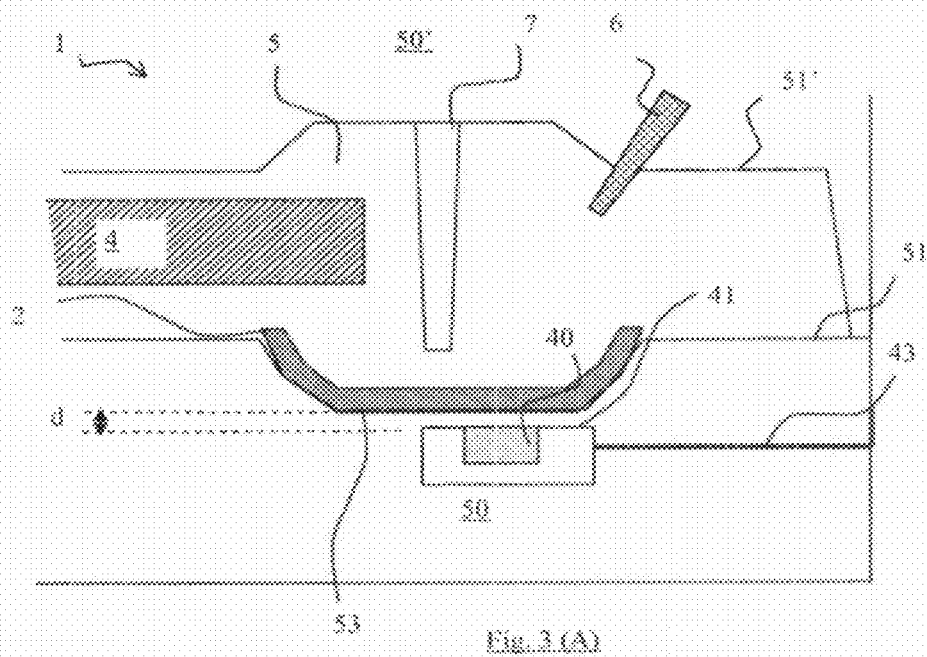
FIG. 3 illustrates a sectional view of the molding cavity of FIG. 2 with the insert held in position.

In the first embodiment illustrated in FIGS. 2 and 3, the magnetization-mediated retention system is actuated by the translational movement of a slide 41 having a single magnet 40, whereas in the second embodiment illustrated in FIGS. 4 to 7 the magnetization-mediated retention system is actuated by the rotation of a disk 42 about itself, this disk having here several magnets 40, 40'. However, the disk could have only a single magnet.

Moreover, the first embodiment of the invention serves to illustrate the implementation of the invention with simple magnetic attraction, whereas the second embodiment of the invention serves to illustrate the implementation of the invention with magnetic attraction/repulsion, as explained below.

According to the invention, to apply a simple attraction force on the insert 2 in said molding cavity 5 during the introduction of said plastic into the molding cavity, at least one magnet 40 is used. This magnet can move between two positions, namely an active position A (FIG. 3) in which it exerts an attractive force on said insert 2 across the internal surface of the molding cavity and an inactive position I (FIG. 2) in which it exerts no attractive force on said insert 2.

To apply attraction/repulsion on the insert 2, at least two magnets 40, 40' are placed with their poles head to tail, so that, in the active position (FIG. 6) of the magnetization-mediated retention system, at least one magnet 40, 40' exerts an attractive force across the internal surface of the molding cavity on the insert 2 and, in the inactive position (FIG. 4) of the magnetization-mediated retention system, the other magnet (40', 40 respectively) exerts a repulsive force across the internal surface of the molding cavity on said insert 2.

In order for the attractive force (or optionally the repulsive force), to be correctly applied across the internal surface of the molding cavity, it may be preferable for the constituent material of the mold, at least in this zone where the insert 2 is placed, not to be ferromagnetic—it is thus paramagnetic. This material may for example be aluminum or an aluminum alloy.

FIG. 2 illustrates the moment when, as regards the first embodiment, the mold is completely closed and the magnetization-mediated retention system according to the invention is actuated. In this FIG. 2, the trim is illustrated at a certain distance from the bottom 53 of the recess 52 so as to clearly show that the magnetization-mediated retention system is not yet activated. In practice, under the effect of gravity, the trim rests in the bottom 53 of the recess 52.

It may be seen in this FIG. 2 that the slide 41 on which the magnet 40 is placed is in the open position: the handle 43 of the slide 41 projects beyond the lower mold portion 50 and the magnet 40 is not placed beneath the recess 52.

In FIG. 3, the trim is illustrated and pressed against the bottom 53 of the recess 52 so as to clearly show that the magnet 40, which has been moved translationally from right to left along the direction given by the arrow T in FIG. 2, by pushing on the handle 43, and which is now beneath the recess 52, attracts the trim through the effect of its attractive magnetic force.

In this active position, the magnet is at a distance d of about 2 to 10 mm from the bottom 53.

Once the slide has closed, the injection of material via the injection orifice 6 can then begin.

Figure 4:
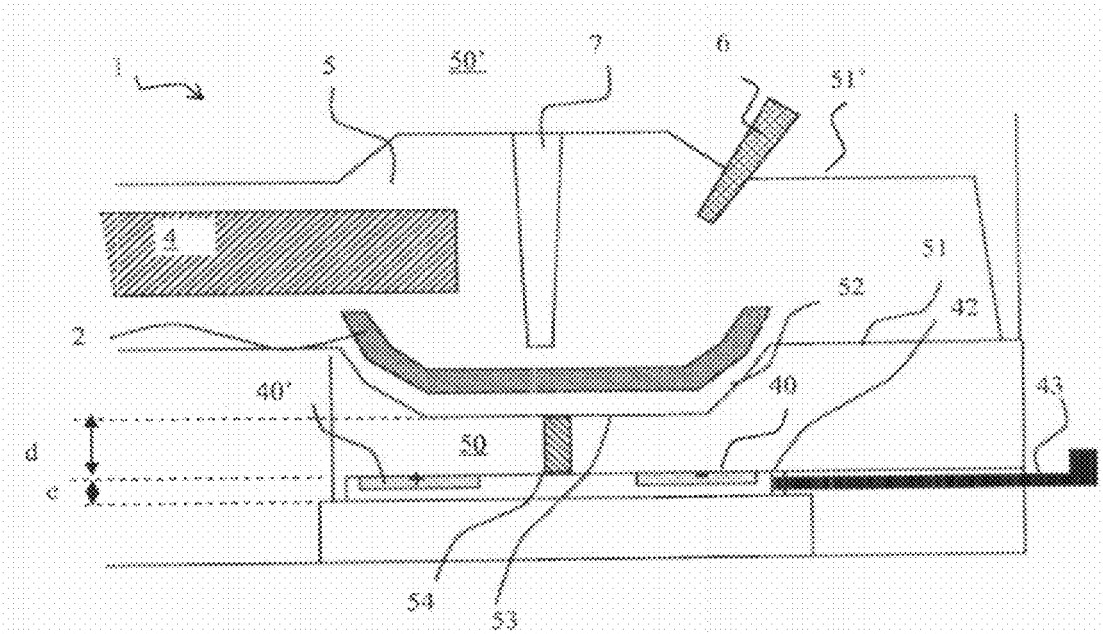
FIG. 4 illustrates a sectional view of a molding cavity in a second embodiment of the invention with the insert not held in position.

FIG. 4 illustrates the moment when, as regards the second embodiment, the mold is completely closed and the magnetization-mediated retention system according to the invention is actuated. In this FIG. 4, as in FIG. 2, the trim is illustrated at a certain distance from the bottom 53 of the recess 52 so as to clearly show that the magnetization-mediated retention system has not yet been activated.

It may be seen in this FIG. 4 that two magnets 40, 40' are placed at a distance d of about 2 to 10 mm from the bottom 53, on the disk 42 which can move rotationally on itself about its vertically-oriented central axis in FIG. 4 by the handle 43 accessible from outside the lower mold portion 50 being moved through about one third of a turn.

These two magnets are separated by a bronze paramagnetic rod 54 fixed in the internal wall of the molding cavity at a height substantially equal to the distance d.

The thickness e of the disk 42 is around 2 to 5 mm.

Figure 5:
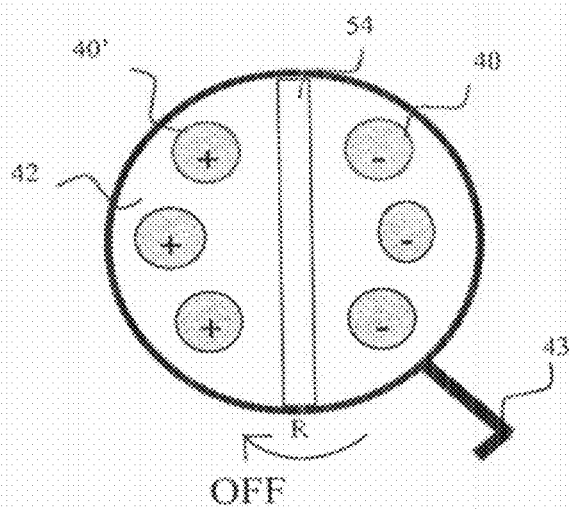
FIG. 5 illustrates a top view of the magnets of FIG. 4.

FIG. 5 illustrates a top view of the disk 42 of FIG. 4, with in addition the rod 54 placed on top of it.

As may be seen, the rod 54 prevents the creation of magnetic fields between the magnets 40, the negative pole of which is upwardly oriented (toward the trim) and the magnets 40', the positive pole of which is upwardly oriented—there is therefore no appreciable attractive force exerted on the trim.

In FIG. 6, the trim is illustrated pressed against the bottom 53 of the recess 52 so as to clearly show that the disk 42, which has been rotated about its central axis as shown by the arrow R in FIG. 7 by pushing on the handle 43, now exerts an attractive force on the trim through the effect of the magnetic attractive force of the magnets.

As may be seen in this FIG. 7 (which is a top view of the disk 42 of FIG. 6, with also the rod 54 placed thereon), the rod 54 no longer opposes the creation of magnetic fields between the magnets 40, the negative pole of which is upwardly oriented (toward the trim) and the magnets 40', the positive pole of which is upwardly oriented—there is therefore no appreciable attractive force exerted on the trim oriented mainly in the longitudinal direction of the trim.

In this position, the injection of material via the injection orifice 6 can then begin.

In a version of the invention that is not illustrated here, it is possible to place a plurality of magnets on a slide so that the set of magnets is divided into two groups of magnets and when one group is in the inactive position I in which it does not exert an attractive force on the insert, the other group exerts a repulse force on said insert.

In the first embodiment of the invention, there is no particular provision in the internal surface zone of the molding cavity that receives the insert other than the formation of the recess 52 (which is moreover optional). In the second embodiment of the invention, there is no particular provision in the internal surface zone of the molding cavity other than, on the one hand, the formation of the recess 52 (which is moreover optional) and, on the other hand, the positioning of the rod 54 (which is useful only for separating the magnetic fields of the magnets on the disk). To implement the invention, there is therefore no seal or any other sealing element in the internal surface area of the molding cavity that receives the insert.

According to the invention, the magnetic attraction applied in the active position is such that the material injected via the injection orifice cannot slip between the insert 2 and the bottom 53 of the molding cavity. Thus, the trim has no plastic on its visible face after molding, that is to say on its face turned toward the bottom 53 during the molding operation.

The location of the magnet(s) and the number of magnets needed depend on the shape and the dimensions of the insert(s): the heavier and larger the insert, the greater the number of magnets required. For large inserts, it may be desirable to use a large number of magnets, each of small size, rather than a small number of magnets, each of large size, so as to be able to have a certain flexibility in controlling the overall attractive force by possibly activating only some of the magnets when molding the beading.

It is also possible to implement the invention for molding a plastic window, in which a constituent material of said plastic window is introduced into a molding cavity in which at least one insert, such as a trim, has been placed beforehand.

In this case, the insert is then directly overmolded onto the surface of said window.

The present invention has been described in the foregoing by way of example. Of course, a person skilled in the art is capable of producing various embodiments of the invention without thereby departing from the scope of the patent as defined by the claims.

The invention claimed is:

1. A process for molding a plastic window assembly having at least one ferromagnetic insert attached to a peripheral edge thereof, the process comprising:
   placing at least one ferromagnetic insert of the window assembly into a molding cavity of a mold;
   introducing a constituent plastic of said plastic window assembly into the molding cavity in which the at least one ferromagnetic insert has been placed beforehand such that the constituent plastic attaches the ferromagnetic insert to the peripheral edge of the window assembly;
   holding said at least one ferromagnetic insert in position in said molding cavity, during the introduction of said plastic, by moving at least one magnet to and active position in which it exerts an attractive force on said ferromagnetic insert across an internal surface of the molding cavity; and moving said at least one magnet to an inactive position in which it exerts no attractive force on said ferromagnetic insert.

2. The molding process as claimed in claim 1, wherein said magnet is moved between the active position and the inactive position by a rotational movement and/or a translational movement.

3. The molding process as claimed in claim 1, further comprising moving a plurality of magnets together in a single movement.

4. The molding process as claimed in claim 3, wherein said plurality of magnets is divided into two groups of magnets such that when a first group is in the inactive position in which it exerts no attractive force on said ferromagnetic insert, a second group exerts a repulsive force on said ferromagnetic insert.

5. The molding process as claimed in claim 4, wherein said ferromagnetic insert is placed in the molding cavity astride a paramagnetic rod.

6. The molding process as claimed in claim 1, wherein said magnet is placed in the active position before the start of injection of the constituent plastic and said magnet is placed in the inactive position after the end of injection of the constituent plastic.

7. The molding process as claimed in claim 1, wherein said magnet is placed in the active position after said insert has been placed in the molding cavity.

8. The molding process as claimed in claim 1, wherein said magnet is placed in the inactive position before the window is removed from the mold.

9. A molding device for implementing the molding process as claimed in claim 1, comprising:
   a molding cavity having an internal molding surface; and
   at least one magnet movably coupled to the molding cavity such that the magnet is movable between said active position in which it exerts an attractive force across the internal surface of the molding cavity on said ferromagnetic insert and an inactive position in which it exerts no attractive force on said ferromagnetic insert.

10. The molding device as claimed in claim 9, further comprising at least one slide configured to move in a translational movement and/or on at least one disk configured to move in a rotational movement.

\* \* \* \* \*